United States Patent
Jalpa Taylor et al.

(10) Patent No.: US 9,834,074 B1
(45) Date of Patent: Dec. 5, 2017

(54) VEHICLE SUNROOF WITH ADJUSTABLE BLIND

(71) Applicant: FORD GLOBAL TECHNOLOGIES, LLC, Dearborn, MI (US)

(72) Inventors: Jonathan Kaleb Jalpa Taylor, Azcapotzalco (MX); Mark Vargas Morelli Luna, Delegacion Xochimilco (MX); German Gutierrez Diaz, Xonacatlan (MX); Edgar Rodriguez Guerrero, Nezahualcoyotl (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/218,697

(22) Filed: Jul. 25, 2016

(51) Int. Cl.
*B60J 3/02* (2006.01)
*B60J 7/00* (2006.01)

(52) U.S. Cl.
CPC .................. *B60J 7/003* (2013.01)

(58) Field of Classification Search
CPC ............. B60J 7/003; B60J 7/0007; B60J 7/22
USPC ....................................... 296/214
See application file for complete search history.

(56) References Cited

U.S. PATENT DOCUMENTS

| | | | |
|---|---|---|---|
| 4,923,244 A | 5/1990 | Clenet | |
| 5,149,170 A * | 9/1992 | Matsubara | B60J 7/022 296/213 |
| 6,015,184 A | 1/2000 | Ewing et al. | |
| 6,282,911 B1 * | 9/2001 | Watanabe | B60H 1/00207 296/208 |
| 6,805,828 B2 | 10/2004 | Raasakka et al. | |
| 7,530,630 B2 | 5/2009 | Jugl et al. | |
| 8,226,160 B2 * | 7/2012 | Hirai | B60J 7/003 160/118 |
| 2006/0076805 A1 | 4/2006 | Santaolalla Gil et al. | |

FOREIGN PATENT DOCUMENTS

| | | | | |
|---|---|---|---|---|
| CN | 102555740 B | 7/2012 | | |
| DE | 19720822 C1 | 3/1999 | | |
| DE | 10317301 A1 * | 11/2004 | | B60J 7/003 |
| FR | EP 1625959 * | 2/2006 | | |
| GB | 2517957 A | 3/2015 | | |
| JP | EP 2138337 A1 * | 12/2009 | | B60J 7/003 |

OTHER PUBLICATIONS

English Machine Translation of CN102555740B.
English Machine Translation of DE19720822C1.
"Replacing Headlining Ford Sierra Cosworth"; Classic Car Project Shop; http://www.classiccarprojectshop.com/2013/02/replacing-headlining-ford-sierra-cosworth/; Feb. 1, 2013, pp. 1-5.

* cited by examiner

*Primary Examiner* — Dennis H Pedder
(74) *Attorney, Agent, or Firm* — Vichit Chea; King & Schickli, PLLC

(57) ABSTRACT

An apparatus is provided for regulating conditions in a vehicle cabin associated with a roof including an opening. A sunroof selectively covers the opening to the vehicle cabin. A blind is adapted for moving from a stowed position within the roof to a deployed position spanning across the opening. The blind includes blades selectively movable for partially blocking light entry while permitting airflow to the passenger compartment in the deployed position of the blind. A plurality of blades may be provided for concurrent operation, and may be adjustable to control a direction of airflow through the opening when the sunroof is open.

20 Claims, 5 Drawing Sheets

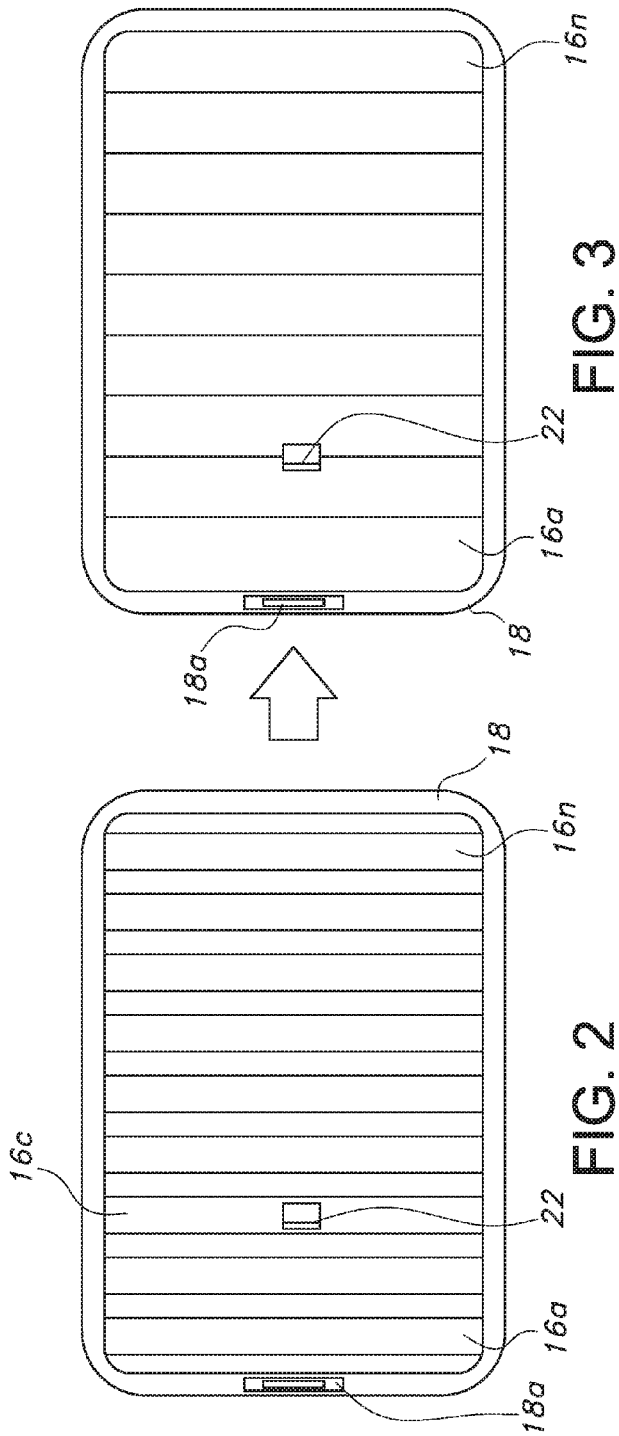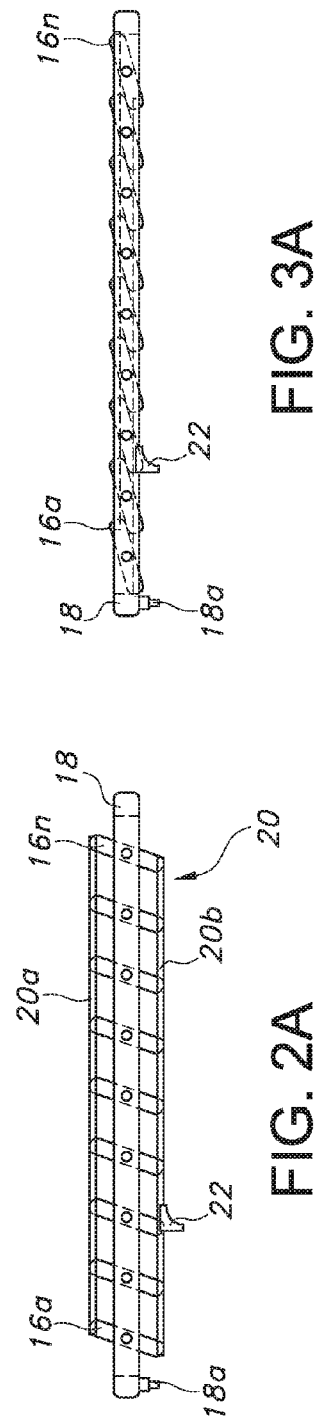

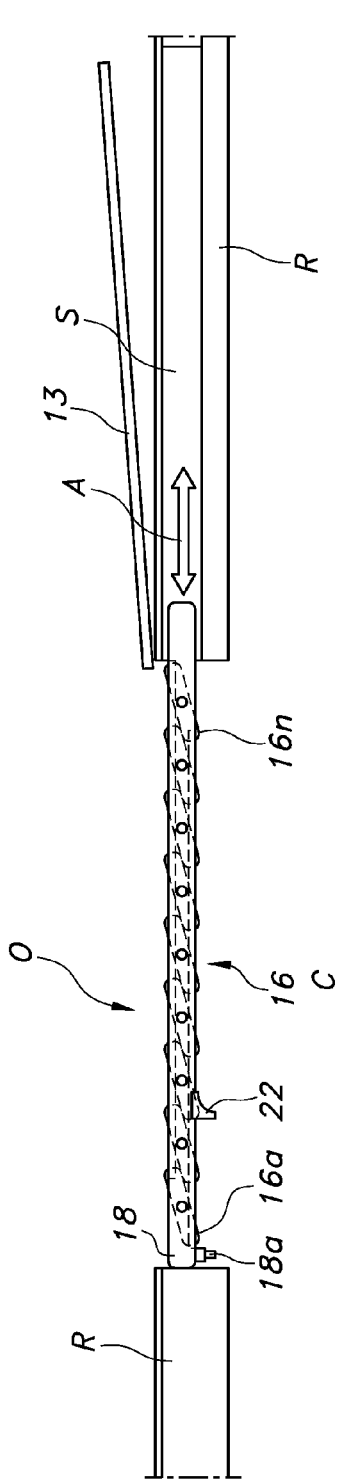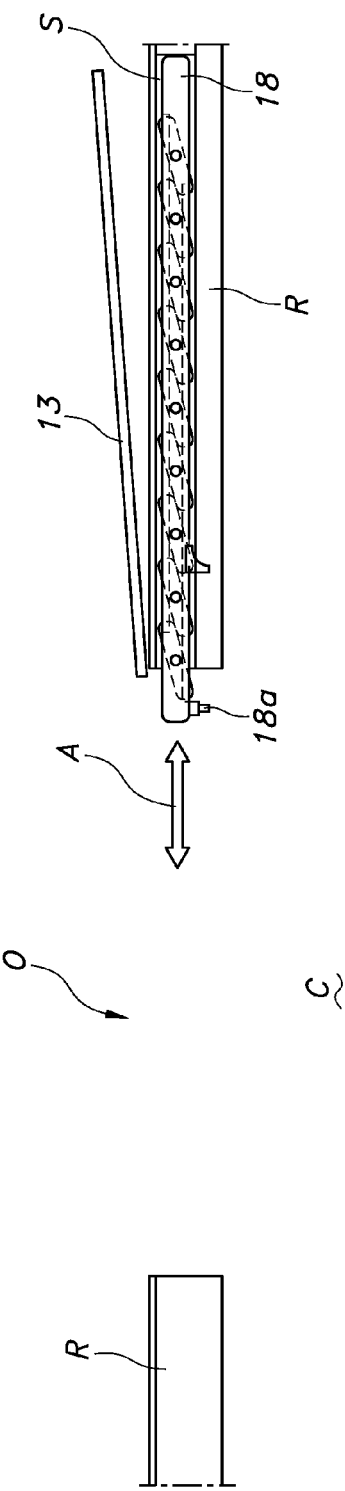

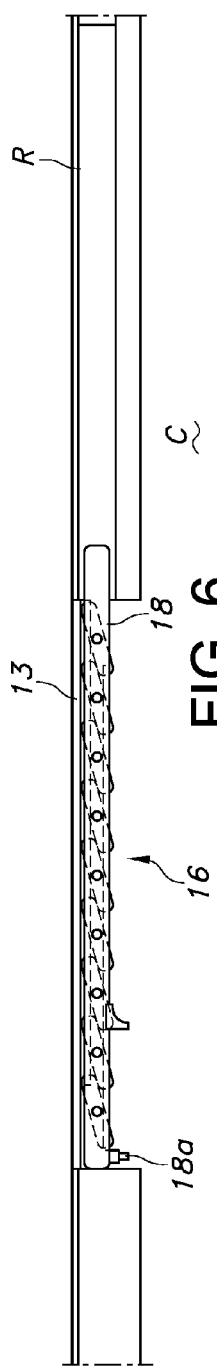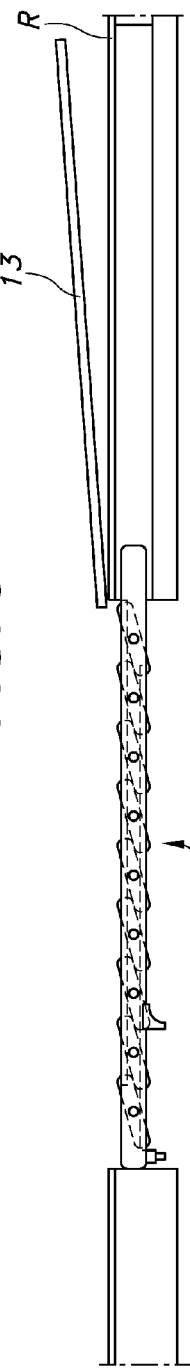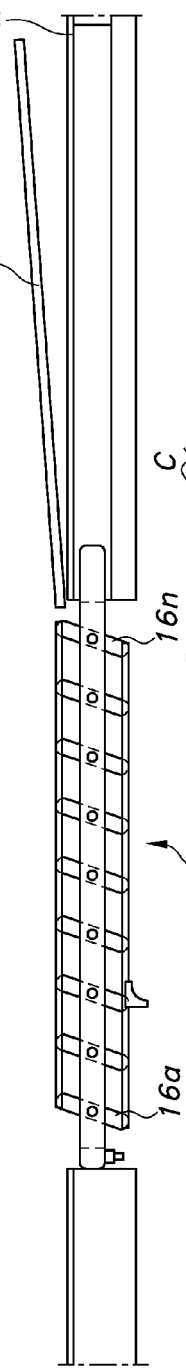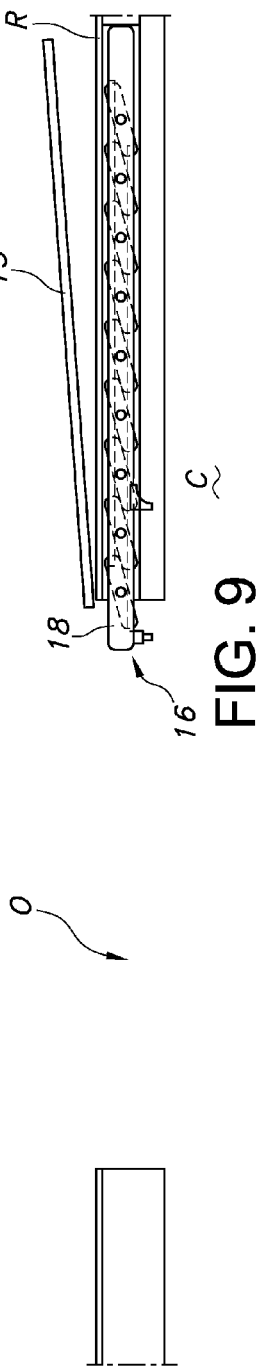

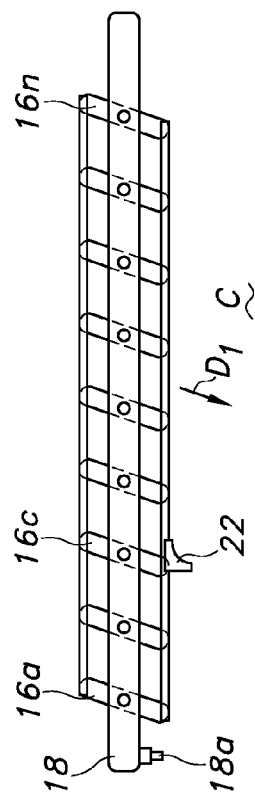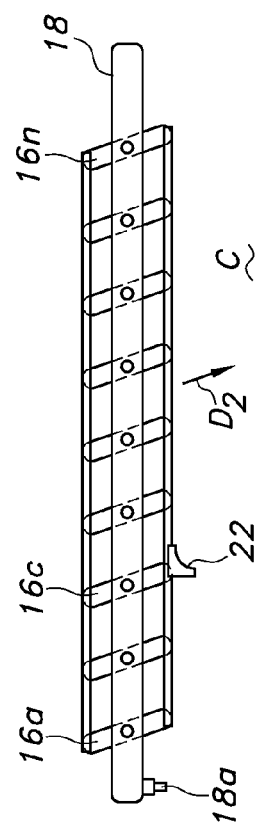

VEHICLE SUNROOF WITH ADJUSTABLE BLIND

TECHNICAL FIELD

This document relates generally to the motor vehicle field and, more particularly, to a vehicle sunroof with an adjustable blind for regulating conditions in the passenger cabin.

BACKGROUND

Vehicle sunroofs often include movable covers to block the transmission of light through the associated window when closed. In daylight conditions, such covers fail to allow for airflow and light to both pass in a selective manner when the sunroof is in an open condition (either fully or partially). Accordingly, a need is identified for a vehicle sunroof that allows for the selectively regulation of the flow of air and light (if present) to the vehicle cabin, including the ability to at least partially block light from entering the cabin while directing airflow to it.

SUMMARY

According to one aspect of the disclosure, an apparatus for regulating conditions in a vehicle cabin associated with a roof including an opening is provided. The apparatus comprises a sunroof for selectively covering the opening to the vehicle cabin. A blind adapted for moving from a stowed position within the roof to a deployed position spanning across the opening is provided. The blind includes at least one blade adapted for moving to selectively blocking light entry while permitting airflow to the passenger compartment in the deployed position of the blind.

In one embodiment, the blind includes a plurality of blades adapted for moving from a first position for substantially blocking the light or airflow to a second position for at least partially admitting the light or airflow. The blind may further include a frame for supporting the plurality of blades. The frame may be adapted for moving from the stowed position, such as within a space in the vehicle roof (such that the sunroof may allow for light to pass and also air, when the sunroof is opened), to the deployed position for positioning the plurality of blades in an operative condition.

The blind may also include a handle. In one embodiment, the handle is connected to the frame. In this or another embodiment, the handle is connected to at least one of the blades, and a connector serves to interconnect the blades for moving concurrently in response to the movement of the handle.

The one or more blades may be generally parallel to a plane of the sunroof in a closed position and generally transverse to the plane in an open position. The sunroof may comprise a window for selectively covering the opening in the vehicle roof. The one or more blades may also be adapted for selectively controlling a direction of the airflow into the passenger compartment.

According to a further aspect of the disclosure, an apparatus for regulating conditions in a vehicle cabin associated with a roof having an opening is provided. The apparatus comprises a sunroof for selectively opening and closing to cover the opening, and a plurality of blades spanning across the opening. Each of the blades is adapted for concurrently pivoting about a fixed mounting point from a first position for covering the opening to a second position for admitting airflow when the sunroof is open.

In one embodiment, a connector is provided for connecting the plurality of blades. An actuator may also be provided for actuating the plurality of blades, which actuator may comprise a handle. A frame may be provided for supporting the plurality of blades, and may be adapted for being recessed within the roof. The plurality of blades may also be opaque for blocking light in the closed position.

Still a further aspect of the disclosure relates to an apparatus for regulating conditions in a vehicle cabin associated with a roof having an opening. The apparatus comprises a sunroof for selectively opening and closing to cover the opening. A plurality of blades span across the opening. The blades are mounted for pivoting from a first position for directing airflow through the opening in a first direction when the sunroof is open to a second position for directing airflow in a second direction when the sunroof is open.

In the following description, several embodiments of the vehicle sunroof with an adjustable blind are shown and described. As it should be realized, the arrangement is capable of other, different embodiments and its several details are capable of modification in various, obvious aspects all without departing from the vehicle sunroof with an adjustable blind, as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the disclosed vehicle sunroof with an adjustable blind, serve to explain certain principles thereof. In the drawing figures:

FIGS. 2 and 2A are bottom and side views of the adjustable blind in an open position for admitting air or light via the opening associated with the vehicle sunroof;

FIGS. 3 and 3A are bottom and side views of the adjustable blind in a closed position for admitting air or light via the opening associated with the vehicle sunroof;

FIG. 4 illustrates the adjustable blind deployed in the roof opening with the window of the sunroof retracted;

FIG. 5 shows the adjustable blind in a fully retracted condition within the vehicle roof;

FIGS. 6-9 are side views illustrating a possible sequence of operation; and

FIGS. 10 and 11 are schematic side views illustrating the adjustment of the blades to control the direction of airflow through the associated sunroof.

Figure 1:
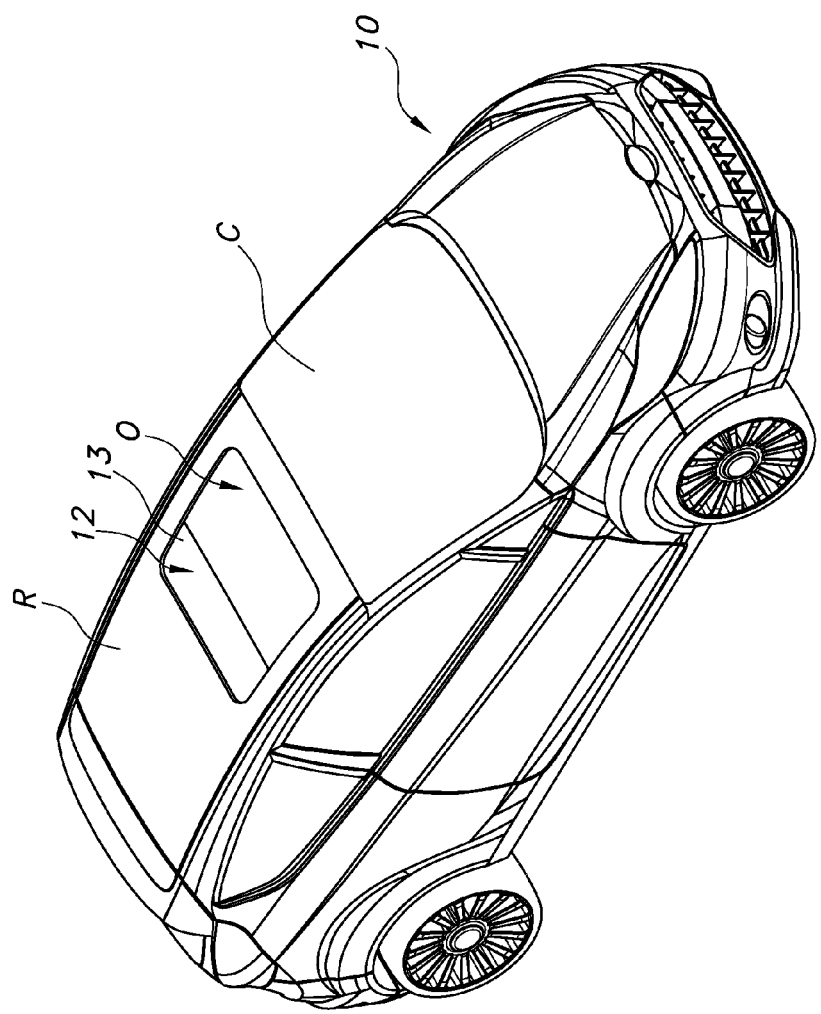
FIG. 1 is a perspective view of a vehicle including a sunroof.

Reference will now be made in detail to the present preferred embodiments of a vehicle sunroof with an adjustable blind, examples of which are illustrated in the accompanying drawing figures.

DETAILED DESCRIPTION

Reference is now made to FIG. 1, which illustrates a vehicle 10 including a sunroof 12. The sunroof 12 is provided in the vehicle roof R and operable between open and closed positions to selectively expose the vehicle passenger compartment or cabin C to the ambient environment for ventilation purposes, and also to admit light during daylight conditions. The sunroof 12 may include a cover, such as a window 13 for covering the opening O in the roof R, while allowing for the transmission of light to the interior or cabin C of the vehicle 10, even when in position covering the opening.

The cover or window 13 may be manually operable, or may be associated with an actuator, such as a motor (not shown). In either case, actuation may cause the window 13 to move between an open condition where air can flow between the ambient environment into the interior of the vehicle cabin C, and a closed condition where no or minimal airflow is permitted. The open condition may be such that the opening formed in the vehicle roof R is either partially or fully open, and may involve moving the window 13 generally horizontally in alignment with the direction of travel, in a generally vertical direction (such as by pivoting), or both.

According to one aspect of the disclosure, and with reference to FIGS. 2-11, an adjustable blind 16 may be positioned adjacent to the sunroof 12, and window 13 in particular, to regulate the admission of light or airflow through the vehicle roof R to the cabin C, and thus control the environmental conditions therein. In one embodiment, the adjustable blind 16 comprises one or more movable blades 16a . . . 16n in the form of elongated, opaque members that span the opening in the vehicle roof R occupied by the window 13 in the closed position. As indicated in FIGS. 2-2A and 3-3A, the blades 16a may be pivoted about a fixed mounting location or point from an open or erect condition (generally perpendicular to the plane of the sunroof 12) for admitting light and air when the sunroof 12 is open to a closed or collapsed condition (generally parallel to the plane of the sunroof) for substantially blocking light or air from entering the cabin C (with "substantially" meaning that a small amount of light or air may still pass as the result of part spacing or tolerances). As can be appreciated, the blades 16a . . . 16n may also be oriented between the open and closed positions to admit air, while substantially blocking light (depending on the degree of pivoting). This selectively position the blades 16a . . . 16n allows for the conditions of the cabin C in terms of air and light entry, and thus passenger comfort, to be selectively controlled in an easy and efficient manner.

As can be understood from FIGS. 2 and 3, the blades 16a . . . 16n may be mounted to a common support for moving or pivoting in the desired manner. For instance, the support may comprise a frame 18 corresponding generally in shape and size to the opening O in the vehicle roof R. Turning to FIGS. 4 and 5, it can be understood that the frame 18 may be positioned for moving from an operative or deployed position occupying the opening O to a withdrawn or retracted position exposing the opening. In one embodiment, this may be achieved by at least partially recessing the frame 18 with the blades 16a . . . 16n in the retracted condition into a space S within the vehicle roof R. A handle 18a may also be provided for manually engaging the frame 18 to effect movement to and fro in the desired direction. Guide rails (not shown) may also be provided along the roof R for guiding the frame 18 for movement to and fro between the deployed and stowed positions.

Consequently, as indicated by action arrow A, the frame 18 may be selectively moved between a closed position (FIG. 4) for blocking the entry of air or light into the cabin C when the blades 16a . . . 16n are not deployed, and an open position (FIG. 5) for allowing for the full and unfettered entry of light (if present, such as during daylight hours) and air through the opening in the roof R when the sunroof 12 is open (that is, the window 13 is withdrawn to expose the opening). Of course, as can be understood from the foregoing description, the blades 16a . . . 16n may also be deployed when the frame 18 is positioned in the opening in the roof R with the window 13 open as well to selectively admit air or light, if present.

A possible sequence of operation of the sunroof 12 including the adjustable blind 16 is shown in FIGS. 6-9. As shown in FIG. 6, the sunroof 12 may be closed with the cover or window 13 and the blind 16 occupying the opening O to prevent the entry of air or light. FIG. 7 illustrates that the sunroof 12 is opened by moving the window 13 to expose the opening O, but the blind 16 may remain in a closed position to prevent light and air from entering. Through suitable adjustment, the operator may selectively open the blades 16a . . . 16n, as indicated in FIG. 8, to permit air and light to enter in a selective manner (and with control of the direction of the airflow depending on the orientation of the blades). Finally, FIG. 9 shows that the entire frame 18 may be retracted within the roof R to fully expose the opening O, such as at night when light penetration may not be a concern, or when the vehicle 10 is still or the airflow level is otherwise deemed acceptable to the occupant(s) of the cabin C.

Turning back to FIG. 3A, it can be understood that the blades 16a . . . 16n may be connected by one or more connectors 20 so as to effect concurrent movement. Specifically, first and second connectors 20a, 20b may connect the blades 16a . . . 16n so that the movement of one effects movement of others in the group. To facilitate this coordinated movement, one of the blades 16a . . . 16n, such as blade 16c in FIG. 3A, may be provided with an actuator, such as a handle 22 for manual grasping for effecting movement in the desired manner. Alternatively, an automated actuator may be provided, such as a rotary motor, which could be controlled by an input in the passenger compartment, such as on the dashboard or console.

The blind 16 may also be regulated to control the direction of light or airflow admitted. As can be appreciated from FIGS. 10 and 11, the blades 16a . . . 16n may be positioned at a first orientation for regulating the entry of light or air in a first direction D1. If a change in direction is desired, such as to direction D2, then the orientation may be selectively adjusted as indicated in FIG. 11, such as by using handle 22. The adjustment may be made at any point through a particular range desired, which can be achieved by controlling the range of pivoting movement of the blades 16a . . . 16n (which is shown as being substantially 180 degrees).

Although not illustrated, it should also be appreciated that the blinds 16 may be utilized to regulate only the entry of light through the sunroof 12. For instance, with the window 13 closed, the position of the blades 16a . . . 16n may be adjusted to regulate the entry of light into the cabin C through the window 13. In such case, the size, number, and spacing of the blades 16a . . . 16n may be adjusted to avoid interfering with the window 13 when closed. The blades 16a . . . 16n may also be optionally made to be partially or fully transparent to light, such that only the flow of air to the cabin C is regulated by the blades in the closed or opened condition.

In summary, a vehicle sunroof 12 with an adjustable blind 16 is disclosed. The blinds 16 may include elongated, pivoting blades 16a . . . 16n mounted to a common support, such as a frame 18, which may be selectively recessed into a space in the vehicle roof R for storage to allow for the free flow of light or air into the vehicle cabin C when the sunroof 12 is open. Alternatively, the blind 16 may be deployed by moving the frame 18 to correspond with the opening in the roof R, at which point the blades 16a . . . 16n may be selectively adjusted to regulate the entry of light, if present, as well as to direct airflow to the cabin C. The blades 16a . . . 16n may also be concurrently controlled by a single actuator, such as a handle 22, to facilitate easy and efficient operation for controlling the environmental conditions in the vehicle cabin C.

The foregoing has been presented for purposes of illustration and description. It is not intended to be exhaustive or to limit the embodiments to the precise form disclosed. Obvious modifications and variations are possible in light of the above teachings. For instance, the blinds 16 could be retrofitted into an existing vehicle by simply installing the blade(s) 16a . . . 16n adjacent to the sunroof 12, such as by pivotally mounting them directly to the roof R or a corresponding structure without using the frame 18. While the blades 16a . . . 16n are also shown as being oriented transverse to the direction in which the window 13 of sunroof 12 opens, the orientation could be changed such that the blades are generally perpendicular to this direction (which is should be appreciated could be achieved without altering the construction of the frame 18 as shown). All such modifications and variations are within the scope of the appended claims when interpreted in accordance with the breadth to which they are fairly, legally and equitably entitled.

What is claimed:

1. An apparatus for regulating conditions in a vehicle cabin associated with a roof including an external opening, comprising:
   a sunroof for selectively covering the opening; and
   a blind for moving from a stowed position to a deployed position spanning across the opening, the blind including at least one blade adapted for moving to selectively block light entry through the opening while directing airflow to the vehicle cabin in the deployed position of the blind.

2. The apparatus of claim 1, wherein the blind includes a plurality of blades.

3. The apparatus of claim 2, wherein the blind includes a frame for supporting the plurality of blades, the frame corresponding in shape and size to the opening in the roof.

4. The apparatus of claim 2, wherein the blind further includes a handle.

5. The apparatus of claim 4, wherein the handle is connected to a frame for supporting the plurality of blades.

6. The apparatus of claim 4, wherein the handle is connected to one of the plurality of blades, and further including a connector for interconnecting the plurality of blades for moving concurrently in response to movement of the handle.

7. The apparatus of claim 1, wherein the at least one blade is generally parallel to a plane of the sunroof in a closed position and generally transverse to the plane in an open position.

8. The apparatus of claim 1, wherein the sunroof comprises a window for selectively covering the opening in the roof.

9. The apparatus of claim 1, wherein the at least one blade is adapted for selectively controlling a direction of the airflow into the passenger compartment.

10. A vehicle including the apparatus of claim 1, and wherein the roof includes a space for receiving the blind in the stowed position.

11. An apparatus for regulating conditions in a vehicle cabin associated with a roof having an external opening, comprising:
    a sunroof for covering the opening; and
    a blind comprising a plurality of blades for spanning across the opening, the blades adapted for concurrently pivoting about a fixed mounting point from a first position for covering the opening to a second position for directing airflow to the vehicle cabin when the sunroof is open.

12. The apparatus of claim 11, further including a connector for connecting the plurality of blades.

13. The apparatus of claim 11, further including an actuator for actuating the plurality of blades to move between the first and second positions.

14. The apparatus of claim 13, wherein the actuator comprises a handle.

15. The apparatus of claim 11, further including a frame for supporting the plurality of blades.

16. The apparatus of claim 15, wherein the frame corresponds in shape and size to the external opening in the roof.

17. The apparatus of claim 11, wherein the plurality of blades are opaque for blocking light.

18. A vehicle including the apparatus of claim 11.

19. An apparatus for regulating conditions in a vehicle cabin associated with a roof having an external opening, comprising:
    a sunroof for covering the opening; and
    at least one blade for spanning the opening and adapted for pivoting from a first position for directing airflow in a first direction when the sunroof is in an open condition to a second position for directing airflow in a second direction in the open condition of the sunroof.

20. A vehicle including the apparatus of claim 19.

* * * * *